United States Patent [19]
Donner

[11] 3,958,846
[45] May 25, 1976

[54] OPEN END SPINNING SPINDLE

[75] Inventor: William E. Donner, Brookfield Center, Conn.

[73] Assignee: The Barden Corporation, Danbury, Conn.

[22] Filed: June 6, 1975

[21] Appl. No.: 584,646

[52] U.S. Cl. .................................. 308/149; 57/133
[51] Int. Cl.² ........................................ F16C 35/08
[58] Field of Search ....................... 308/149; 57/133

[56] References Cited
UNITED STATES PATENTS

| | | | |
|---|---|---|---|
| 2,170,879 | 8/1939 | Tarbell | 308/149 |
| 2,249,387 | 7/1941 | Kelley | 308/149 |
| 2,981,051 | 4/1961 | Maurer | 308/149 |
| 3,782,100 | 1/1974 | Stahlecker | 308/149 |

*Primary Examiner*—M. H. Wood, Jr.
*Assistant Examiner*—Richard A. Bertsch
*Attorney, Agent, or Firm*—Shenier & O'Connor

[57] ABSTRACT

A bearing assembly for the rotor shaft of an open-ended spinning machine in which the bearing housing is formed with a bypass passage to allow air flow resulting from pressure differentials between the two ends of the bearing housing to bypass the bearing elements, thereby prolonging their life. In another embodiment, the bypass passage is formed in the rotor shaft.

12 Claims, 4 Drawing Figures

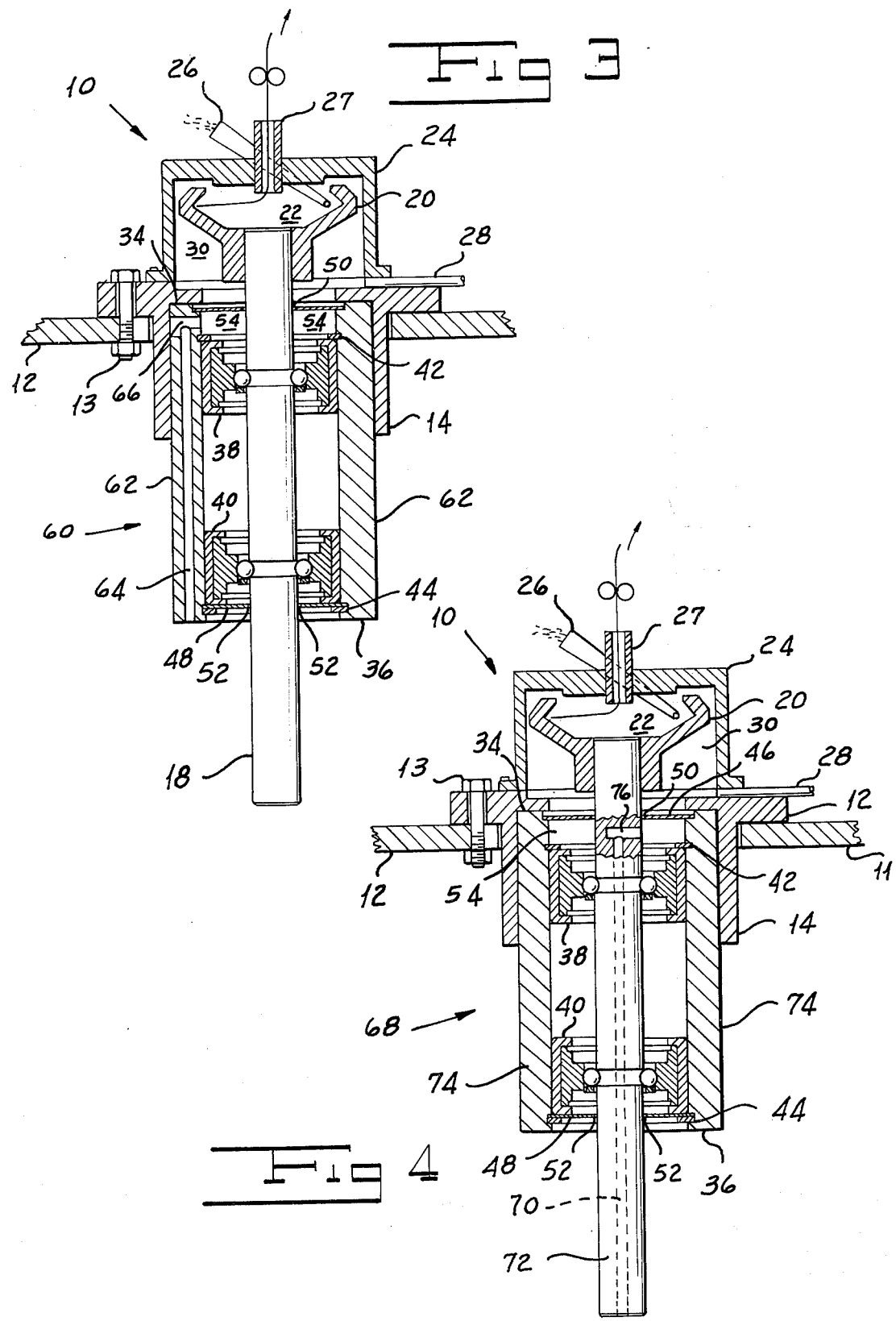

OPEN END SPINNING SPINDLE

BACKGROUND OF THE INVENTION

Open ended spinning machines of the type having a bowl-shaped rotor or spinning chamber are common in the art. Yarn is produced by spinning the rotor at a high rotational velocity, typically about 15,000 rpm, and supplying fibers to the interior of the rotor.

Owing to the high rotational speeds used, it is necessary to maintain the rotor interior at a subatmospheric pressure for proper operation. This is usually accomplished by enclosing the rotor within a housing and connecting the housing to a suitable vacuum source. When, however, the bearing assembly used to receive the shaft supporting the rotor forms part of the enclosure surface, as is common, the partial vacuum created in the housing tends to draw air into the housing through the bearings themselves, causing the lubricants in the bearings to dry out prematurely, thus shortening the bearings' operating life.

I have invented an open-ended spinning spindle assembly which overcomes the problem in the prior art of loss of bearing lubricant. My assembly is simple in construction. My assembly may make up a part of the rotor housing of the spinning unit.

SUMMARY OF THE INVENTION

One of the objects of my invention is to provide a bearing assembly for an open-ended spinning machine which minimizes premature loss of bearing lubricant.

A second object of my invention is to provide a bearing assembly which may form part of the rotor housing.

A third object of my invention is to provide a bearing assembly which has a simplified construction.

Other and further objects of my invention will appear in the following description.

In general, my invention contemplates the provision, in an assembly in which air is removed from the closed end of a bearing housing of a low resistance air bypass path for air which otherwise would be drawn through the bearings of the assembly. In two embodiments, the bypass passage is formed in the housing itself; in a third, the passage is formed in the rotor shaft.

Preferably, for ease of machining, the bypass passage is formed by an axial passage originating at the end of the assembly remote from that from which air is being withdrawn and a cross passage linking the air flow region with the axial passage. The axial passage in the bearing housing may, if desired, comprise an axial slot or, alternatively, an axial bore running from the other end of the housing to a point adjacent to the airflow region. In the embodiment in which the passages are in the shaft, the axial passage is preferably formed as a center bore. The cross passages may comprise radial bores. The exact dimensions of these passages are not critical; it is preferable, however, that they have a sufficiently large cross-sectional area such that the resistance offered by such passages to the flow of air is much less than that of the bearing assembly itself, thus affording effective bypassing action. It is also desirable that the bearing assembly end cover defining the air flow region provide a narrow clearance gap between it and the protruding rotor shaft such that the resistance offered by the bypass passage to the flow of air is less than that of the clearance gap. This narrow clearance gap provides a "series" airflow resistance element which augments the shunting action of the bypass passage. The orientation of the bearing housing with respect to the rotor is not critical, although in the embodiments shown, the airflow end is arranged facing the rotor. The location of all the bypass passages in a single body of material, whether in the bearing housing or in the shaft, allows a simplicity of construction and flexibility of use which are not found in bearing assemblies of the prior art.

BRIEF DESCRIPTION OF THE DRAWINGS

In the accompanying drawings to which reference is made in the instant specification and in which like reference characters are used to indicate all parts in the various views:

FIG. 3 is a sectional view of another embodiment of our bearing assembly as it is employed in an open-ending spinning machine.

FIG. 4 is a sectional view of still another embodiment of our bearing assembly as it is employed in an open-ended spinning machine.

DETAILED DESCRIPTION OF THE INVENTION

Figure 1:
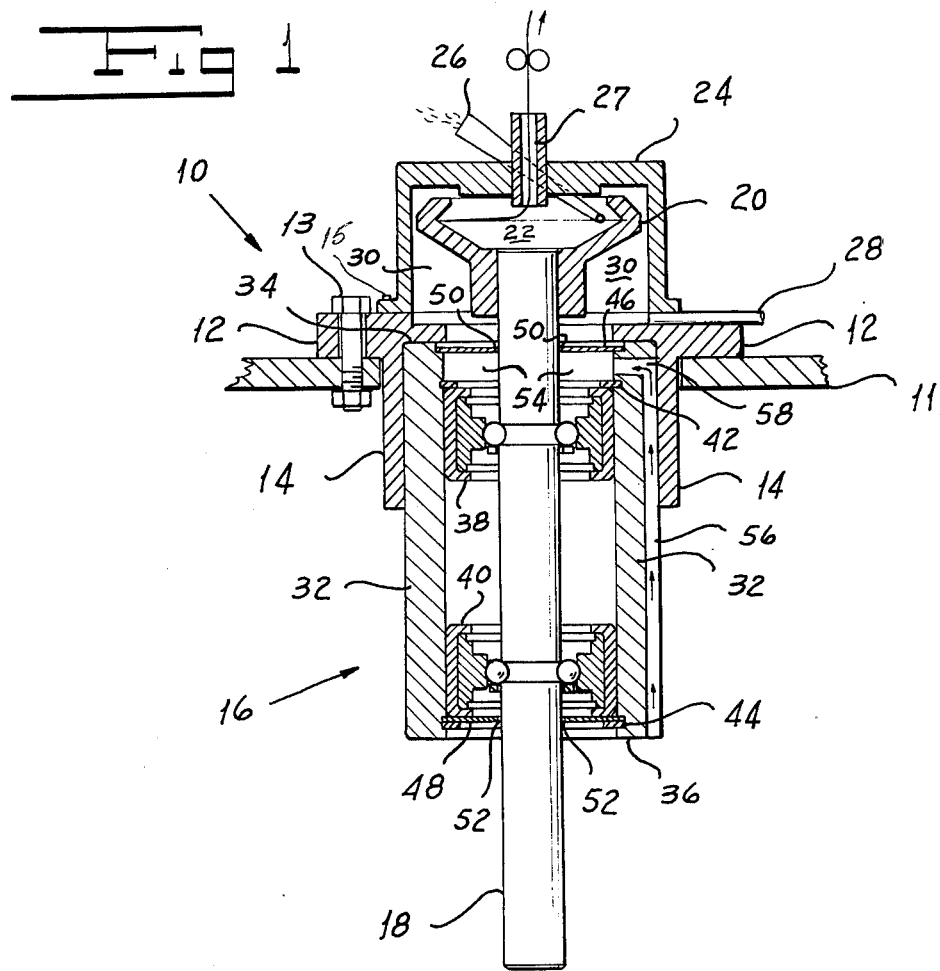
FIG. 1 is a sectional view of one embodiment of our bearing assembly as it is employed in an open-ended spinning machine.
Figure 2:
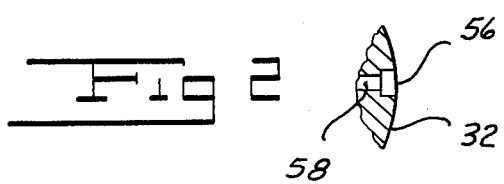
FIG. 2 is a fragmentary sectional view of the embodiment shown in FIG. 1 as viewed along lines 2—2.

Referring now to FIGS. 1 and 2, the open-ended spinning unit, indicated generally by the reference character 10, with which my bearing assembly is employed includes a bearing assembly support 14 having a mounting flange 12 secured to a frame 11 by means of bolts 13 or the like. Screws 15 or the like secure a rotor housing 24 to flange 12. A shaft 18, supported in my bearing assembly indicated generally by the reference character 16 and to be described more fully hereinbelow, carries the bowl-shaped rotor 22 forming a spinning surface 22. Any suitable means such as a tapered tube 26 may be employed to supply loose fibers to be spun to the surface 22. The spun yarn may be withdrawn through a tube 27 by any suitable means. As is known in the art, for proper orientation of the fibers fed to surface 22, air must be withdrawn from the space enclosing the rotor 20, as, for example, through a conduit 28.

The bearing assembly 16 comprises a cylindrical housing 32 having an upper or rotor end 34 and a lower or drive end 36. The housing 32 is fitted with upper and lower bearings 38 and 40 for receiving the shaft 18. The bearings are located axially by retaining rings 42 and 44 and are shielded from dust and other atmospheric impurities by cover plates 46 and 48 located at the upper and lower ends of the housing 32 respectively, which cover plates are separated from the shaft 18 by radial clearance gaps 50 and 52 respectively. I so arrange my assembly that the upper bearing 38 is separated from the upper end 34 of the housing and from the upper cover plate 46 by a space 54 within the housing. I provide housing 32 with an axial slot 56 on its periphery extending from the lower end 36 to a point adjacent to the space 54. A substantially radial passage 58 connects the space 54 with the axial slot 56. It will be seen from the above description that a bypass air passage leading from the enclosed area 30 to the surrounding atmosphere is provided by the clearance gap 50, the airflow region 54, the radial passage 58, and the axial slot 56.

Referring now to FIG. 3, an alternative embodiment 60 of my bearing assembly has a modified housing 62 in which the axial passage is a bore 64 connected by a shortened radial passage 66, rather than the slot 56 shown in FIG. 1.

In FIG. 4, a further embodiment 68 of my bearing assembly includes an axial bore 70 which is provided in the shaft 72 rather than in the housing 74. A suitable radial passage 76 is provided in the shaft 70 to connect the axial bore 70 with the airflow region 54.

In operation of all forms of my bearing assembly for use with an open-ended spinning spindle air is removed from the space enclosing the rotor 20, tending to draw air through the bearings mounted in the housing 32 or 74. In my assembly, however, the slot 56 and passage 58 in FIG. 1, for example, provide a path of extremely low resistance to the flow of air from the atmosphere into the space 54 as compared with the relatively high resistance path through the bearing assembly. Thus air drawn in the space 30 from space 54 is provided principally if not entirely by the bypass path and the flow of air through the bearings is minimized if not eliminated. Thus, lubricant will not be drawn out of the bearing in such a way as to reduce its useful life.

It will be seen that I have accomplished the objects of my invention. I have provided a bearing assembly especially adapted for use with an open end spinning spindle. My assembly inhibits loss of lubricant under the action of a flow of air resulting from the spinning operation. The bearings of my assembly have a relatively long life. My assembly is relatively simple for the result achieved thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A shaft and bearing assembly for an open-ended spinning unit including in combination, a unitary bearing housing, a bearing, means mounting said bearing in said housing at a location spaced from an end of said housing, a shaft supported in said bearing and extending through said housing end, and an air flow restrictor surroundng said shaft adjacent to said housing end to form a space between said restrictor and said bearing, one of said housing and said shaft being formed with a low resistance air bypass passage leading from outside said housing into said space.

2. An assembly as in claim 1 in which said bypass passage is formed in said housing.

3. An assembly as in claim 2 in which said bypass passage comprises an axial passage extending from the other end of said housing to a point adjacent to said end region and a radial passage connecting said space to said axial passage.

4. A bearing assembly as in claim 3 in which said axial passage comprises an axial slot formed on the periphery of said housing.

5. A bearing assembly as in claim 3 in which said axial passage comprises an axial bore formed in said housing.

6. A bearing assembly as in claim 1 in which the bypass passage has a sufficiently large cross-sectional area such that the resistance offered by the passage to the flow of air is less than that of the bearing.

7. A bearing assembly as in claim 1 in which said housing is a unitary cylindrical body of material.

8. An assembly as in claim 1 in which said bypass passage is formed in said shaft.

9. A bearing assembly as in claim 8 in which said bypass passage comprises an axial passage extending from the other end of said housing to a point adjacent to said one end thereof and a cross passage connecting said space with said axial passage.

10. A bearing assembly as in claim 9 in which said axial passage comprises an axial bore formed in said shaft.

11. An assembly as in claim 1 in which said bearing comprises an inner raceway formed integrally with said shaft.

12. A shaft and bearing assembly for an open-ended spinning unit including in combination, an elongated open-ended unitary bearing housing, a pair of bearings, means mounting said bearings in said housing in spaced relationship to each other and with one of said bearings spaced from an end of said housing, a shaft supported in said bearings to extend through said housing end, and an air flow restrictor surrounding said shaft adjacent to said housing end to form a space between said restrictor and said one bearing, one of said housing and said shaft being formed with a low resistance bypass passage leading from outside said housing to said space.

* * * * *